Patented June 29, 1937

2,085,108

UNITED STATES PATENT OFFICE 2,085,108

MEAT PRODUCT AND MEANS FOR AND METHOD FOR PRODUCING THE SAME

Felix H. Louisot and Charles J. Muller, Hasbrouck Heights, N. J.

Application September 29, 1934, Serial No. 746,071

4 Claims. (Cl. 99—107)

This invention relates to meat and fat products and means for and methods for preparing the same.

In the preparation of certain meats for cooking, it is customary to wrap a mass of flattened fat around the meat and to tie the fat in place with cord. The practice of butchers at the present time in obtaining the slabs needed for wrapping around meat is to pound a lump of fat either with a meat cleaver or with a wooden mallet until the desired thickness is obtained. Such pounding naturally results in a more or less irregular mass or slab of fat which is seldom of uniform thickness or width so that difficulty is experienced in wrapping the slab around the meat. The fat, of course, is trimmed to fit the meat and the trimmed parts used to fill in vacant spaces, with resultant loss of uniformity in the wrapping and loss in appearance. With this present practice, only certain portions of the fat known as cod fat can be used so that a considerable quantity of fat such as trimmings, scraps, waste, etc. cannot be used for this or any other advantageous purpose.

An object of the present invention is to provide as a new article of manufacture a strip of animal fat of substantially uniform thickness and substantially uniform width.

Another object of the invention is to provide a strip of the character previously set forth in which the fibers of the fat are crossed to aid in holding the strip together.

Another object of the invention is to provide methods of preparing a strip of fat of the character set forth.

Another object of the invention is to make possible the use of all fats such as trimmings, scraps, waste and cod fat for wrapping around meat prior to cooking.

A further object of the invention is to provide a mechanism for shaping fat or other meat products into a strip of substantially uniform thickness and substantially uniform width.

An additional object of the invention is to provide a shaping device which can be attached to a part of a conventional meat grinder, such shaping device consisting in part of a funnel having an outlet opening which is of substantially rectangular shape in cross-section.

A still further object of the invention is to provide means within the funnel for causing the fibers passing therethrough to be crossed in the ultimate strip.

Another object of the invention is to provide in conjunction with a funnel, a passageway for meat products so shaped as to cause the meat products to assume a strip form, such passageway being constructed to permit the size thereof to be varied.

In carrying out the invention and particularly in its relation to the processing of animal fat, the mechanism utilized consists of the usual conveyor screw of a meat grinding machine to the end of the casing of which is secured a funnel member leading into a passageway. The knives and plate of the grinding machine of course are dispensed with. The funnel tapers, and has an outlet opening extending along the sides and across the end of the funnel, such opening leading into a passageway which is substantially rectangular when considered in cross section. This passageway is made up of a lower and an upper section, the lower section having a floor and upstanding side walls, while the upper section has a top and depending side walls. If desired the lower section may be permanently secured to the funnel or may be removably secured thereto while the upper section is necessarily removably secured to the funnel so that sections having depending side walls of varying dimensions can be utilized to change the height of the passageway. When both sections are removably secured to the funnel, it will be evident that they can be interchanged with other matched sections to vary the width as well as the height of the resultant strip. The funnel is provided with guiding ribs or vanes formed in the upper and inner surface thereof and inclined in such direction that meat products passing through the funnel will be given opposite directional movement so that where the meat products are fibrous in nature the fibers in effect will be crossed in the finished strip.

The lower section of the passage way preferably extends a short distance beyond the upper section and has as a continuation thereof an inclined delivery chute or slideway in the nature of spaced separated rods. A knife may be pivotally secured to the lower section so that desired lengths of the strip emerging from the passageway can be cut off. Suitable indicating mechanism can be provided on the delivery chute for aiding in determining the proper lengths of the strip to be cut.

In some instances, it will be desirable to have the finished strip resting on waxed paper, or other suitable paper, and for this purpose an opening is provided in the lower section of the passageway through which a strip of paper from a roll may pass. This paper is fed under the emerging strip of meat products so that as this strip passes along the extension of the lower section it rests upon the paper strip, and due to the adhesion between the meat and the paper strip, the paper strip advances with the meat strip. To aid in causing good adhesion between meat strip and paper strip, a weighted member is provided which can be moved into position to rest upon the meat strip as it emerges from the shaping passageway. When it is desired that the paper strip be omitted, a suitable brake or locking member can be operated to prevent unwinding of the paper from the roll.

While the mechanism previously described has been designed primarily for the treatment of fat, it will be evident of course that other meat products can be processed thereby, and particularly ground meat products, such as hamburger meat, etc., can be processed with facility. The hamburger meat emerging from the shaping passageway can be cut into suitable lengths and each section will have an undercoating of sanitary paper to aid in the handling or preparation of meat for sandwiches.

Other features, objects and advantages of the invention will become apparent by reference to the following detailed description taken in conjunction with the accompanying drawings, wherein Fig. 1 is a plan view of the mechanism for processing the meat products.

Fig. 6 is an enlarged section substantially on the line 6—6 of Fig. 1.

Fig. 7 is a plan view of a strip of fat made in accordance with the invention.

Figure 1:
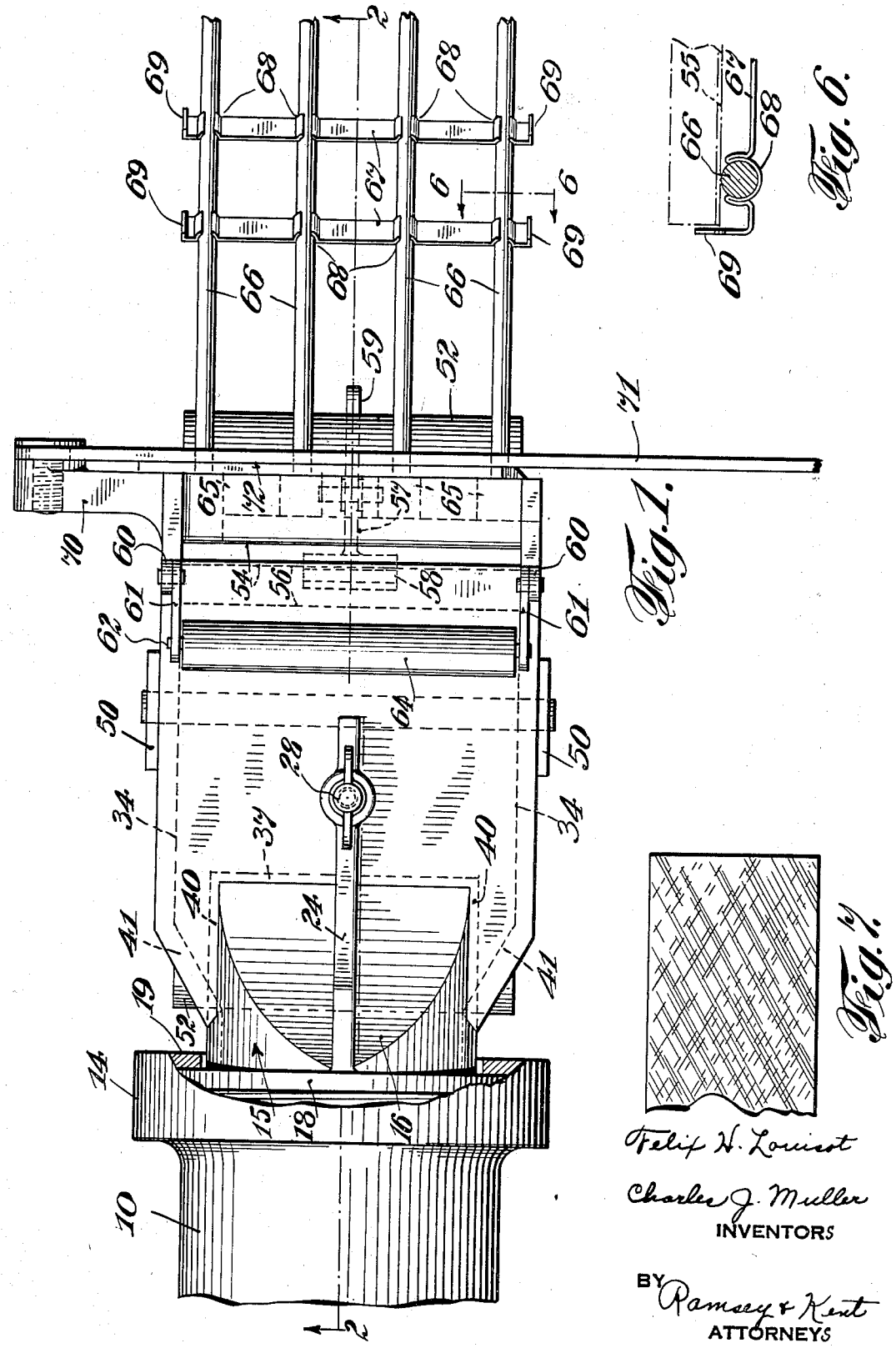

Referring now to the drawings, 10 indicates a cylindrical housing for the feed screw 11 of an ordinary meat chopping machine. The housing 10 has external threads 12 at one end thereof to be engaged by the threads of a retaining ring 14 which normally serves to hold the chopping blades to the end of the housing.

Figure 5:
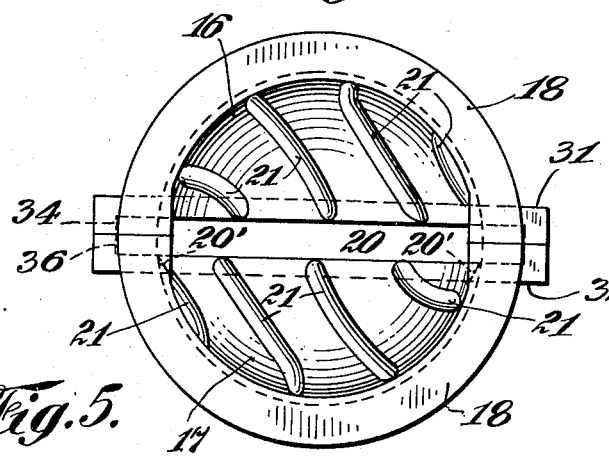
Fig. 5 is a section substantially on the line 5—5 of Fig. 2 showing the manner in which the guide ribs or vanes are unwound.

Secured to the end of the housing 10 by means of the ring 14 is a funnel 15 illustrated in the drawings as being made of an upper section 16 and a lower section 17. It will be understood of course that the funnel may be made as a unitary device instead of being made in two sections as shown. This funnel 15 is provided with a flange 18 which seats against the end of the housing and is engaged by the annular flange 19 of the retaining ring 14 to lock the funnel to the housing. The mouth of the funnel as shown clearly in Fig. 5 is substantially circular in cross section, but the wall of the funnel tapers to the rear in such fashion as to provide an opening indicated at 20 in Fig. 5. The opening 20 has extensions 20' along the sides of the funnel, thereby providing an outlet extending along the sides and across the end of the funnel. This outlet is so shaped as to be substantially rectangular in cross-section. The upper and lower inner surfaces of the funnel are provided with inclined ribs or vanes 21, the purpose of which will be explained in describing the operation of the device. The two sections 16 and 17 are provided with external web portions 24 and 25 respectively which extend beyond the outlet end of the funnel and which are provided respectively with bosses 26 and 27. These bosses are provided with screw threaded apertures extending entirely therethrough for the reception of bolts 28 and 29. The bolts 28 and 29 may be similar, that is, they may be wing bolts as indicated by the part 28 or may be slotted bolts as shown by the part 29.

The communication with the outlet of the funnel is a shaping passageway 30 formed by an upper member 31 and a lower member 32. The upper member 31 has a flat top 33 and depending side walls 34. The lower member 32 has a flat bottom 35 and upstanding side walls 36. The top 33 has a portion thereof cut away to form a beveled edge 37 adapted to fit snugly against the beveled edge 38 formed exteriorly of the outer end of the upper section 15. The extensions 39 of the top 33 have their inner edges beveled as at 40 to fit snugly against the exterior of the upper section 15. Since the space between the depending side walls 34 is greater than the width of the opening 20 these walls 34 have angular portions 41 which extend into contact with the upper section 15 of the funnel. The extension 39 with the walls 34 and 41 are located to receive material passing from the portions 20' of the funnel outlet.

The lower section is constructed in the same manner as the upper section with the exception that the bottom 35 extends a short distance beyond the end of the top 33. These two sections are held in place by sliding the extensions as represented at 39 into engagement with the exterior of the funnel sections and with the outer surfaces of the top 33 and the bottom 35 contacting with the webs 24 and 25. They may then be locked in place by tightening the bolts 28 and 29. When so tightened the side walls 34 and 36 together with the top 33 and the bottom 35 cooperate to form a rectangular cross-sectional passage 30, part of which tapers outwardly from the outlet of the funnel until the maximum width of the passageway is reached.

Depending from the lower member 32 of the shaping passageway are a pair of supports 50 provided with a number of openings 51 through which may be inserted a rod upon which is wrapped a roll of paper 52. The various openings of course are designed to accommodate rolls of different diameters. The bottom 35 is provided with a cross axial opening 54 through which the strip of paper 55 from the roll 52 may pass. One wall of the opening 54 may be beveled as at 56. A brake member 57 is pivotally secured beneath the bottom 35 and is provided with a head 58 of some good friction material such as rubber and also has a handle 59. The brake can be moved into the position shown in full lines in Fig. 2 to prevent unwinding of the paper from the roll 52, which unwinding would be due to the pressure applied by the head 58 to the paper against the surface 56, or the brake can be moved to the dotted line position to permit passage of the paper through the opening 54.

Figure 2:
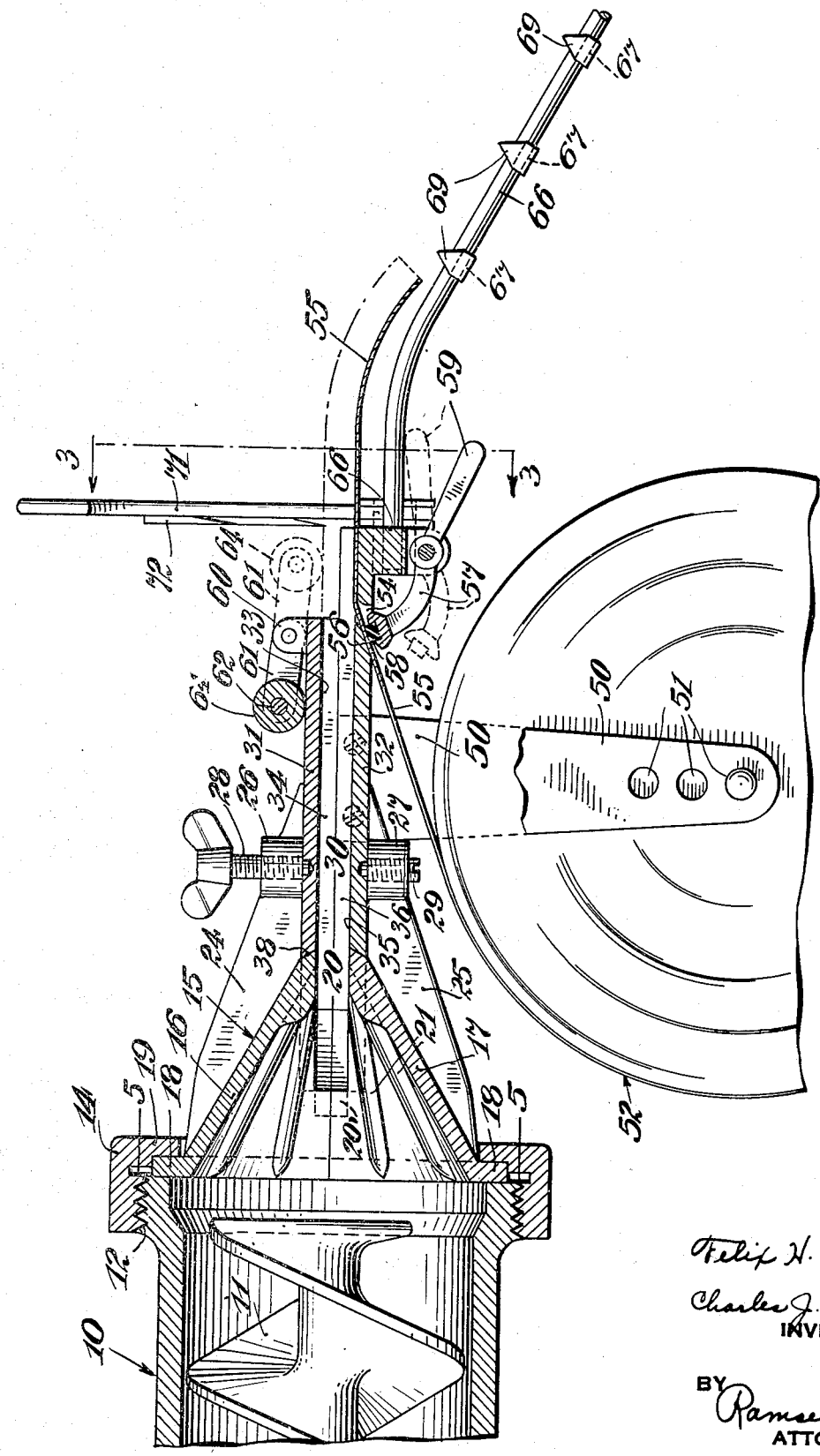
Fig. 2 is a section taken substantially on the line 2—2 of Fig. 1.
Figure 3:
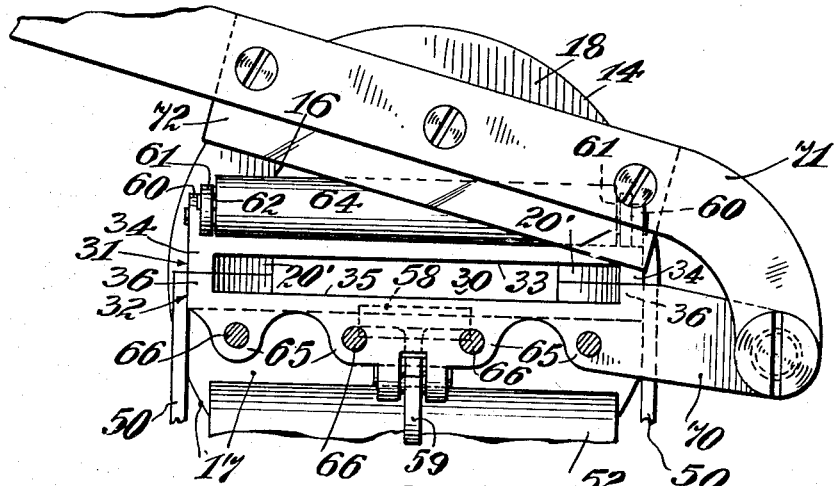
Fig. 3 is a section taken substantially on the line 3—3 of Fig. 2.
Figure 4:
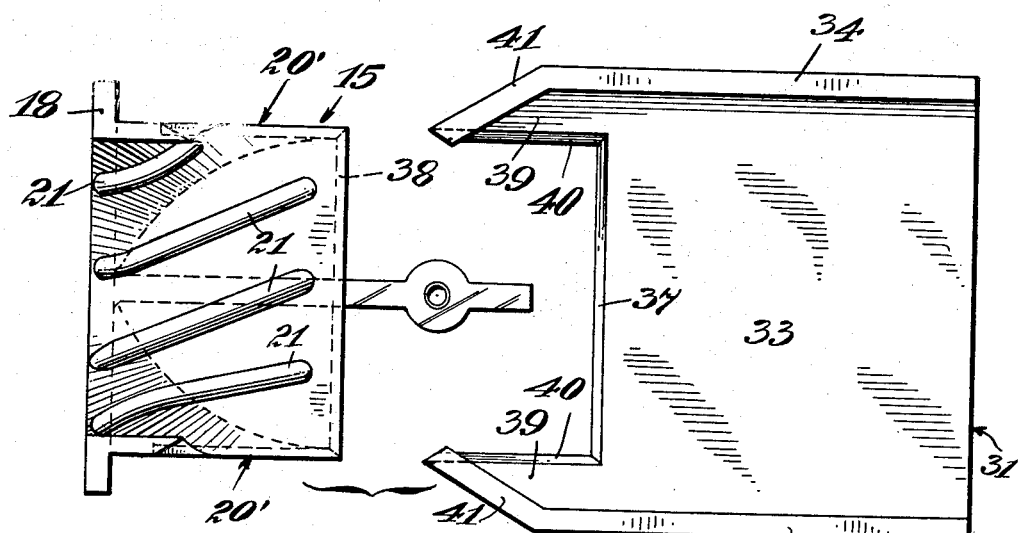
Fig. 4 is a bottom view of a half of the funnel and the upper section of the shaping passageway.

Extending upwardly from the upper member 31 are two studs 60 to which are pivotally secured arms 61. The other ends of the arms 61 are apertured for the reception of the shafts 62 of a roll 64. This roll shown in heavy lines in Fig. 2 is in inoperative position. When moved to the dotted line position, the roll will serve to apply pressure to the meat products emerging from the shaping passageway.

The bottom 35 is provided with a number of depending enlargements 65 into which are secured rods 66 fastened together to form a chute or slideway. The manner in which the rods are held spaced apart is illustrated in detail in Figs. 1 to 6. In these figures, it will be seen that a strip of metal 67 is shaped to provide a number of pockets 68 in which the rods 66 are held. The ends of the different strips 67 can be continued to form upright pointers for a purpose to be explained later.

Extending outwardly from the underside of the bottom 35 is a support 70 to the end of which is pivotally mounted an arm 71 having a knife blade 72 secured thereto. The free end of the arm 71 serves as a handle. This blade is so positioned that it will just clear the end of the bottom member 35.

The use and operation of the device is substantially as follows: When it is desired to produce strips of fat for wrapping around meat to be cooked, any of the fat, and particularly that fat known in the art as cod fat, trimmings, scraps, and waste is fed to the feed screw of the machine in the usual fashion. The fat may be in lumps, strips, or in any other shape. The feed screw in pushing the fat through the housing 10 works the separate pieces into a more or less homogeneous mass. The screw finally pushes the mass into the funnel and as is usual in these types of devices, the mass travels more or less in a straight line with very little rotary movement. As the result of being forced into the funnel, the mass of fat is in effect extruded therefrom through the outlet opening. As this mass moves through the funnel the guiding vanes or ribs 21 serve to impart cross directional movement to the upper and lower parts of the mass so that in effect the upper part of the fat passing through the outlet is crossed over the lower part. Since animal fat is fibrous by nature, the result will be that the fibers will more or less be crossed, aiding in holding the strip together. In fact, in practice, it has been found that the absence of the inclined guiding ribs or vanes results in a much inferior product. When the fat passes through the outlet opening it immediately enters the shaping passageway defined by the upper and lower members 31 and 32. Since this passageway, in almost its entirety, is wider than the funnel, the fat is forced through the entire outlet, filling the passageway after which it is forced through and out of this passageway.

The fat emerging from the passageway is in the nature of a strip of substantially uniform width and substantially uniform thickness in which the fibers are crossed from top to bottom. This arrangement is shown as clearly as possible in Fig. 7 in which the fibers of the upper part of the strip are shown in full lines as being substantially crossed at right angles to the fibers of the lower part of the strip indicated in dotted lines.

If desired the emerging strip of fat may be provided with an underlayer of paper fed from a roll 52 through the opening 54. The roll 64 resting on the meat strip presses it firmly against the paper strip so that the two strips adhere, causing unwinding of the paper from the roll. The strip of fat either with or without the paper underlayer slides over the end of the bottom member of the shaping passageway onto a chute or slideway formed by the rods 66. This strip may be permitted to continue indefinitely or may cut off any desired lengths by means of the knife 72.

The strip so processed has been found in practice to be a strip admirably suited for wrapping roasts. The uniform size of the strip aids materially in the wrapping and in addition, since all types of fat can be made use of, the result is that more roasts can be wrapped with fat than under prior practice. Waste consequently is materially reduced.

The invention of course in the mechanical phase thereof is not limited to the processing of fat, since other meat products can be worked with facility. For example, ground meat products, such as hamburger meat, etc., may be fed through the funnel by the feed screw in the same manner and with the same results, namely, that a strip of ground meat will emerge from the shaping passageway and will be delivered to the slideway. If the meat is being prepared for sandwiches, suitable lengths of the strip can be cut off as the strip passes onto the slideway. For this purpose the pointers 69 can be used to indicate various lengths to be cut off. For example, if a certain length strip is desired, the knife will be operated when the end of the meat strip reaches the first pointer 69. For longer lengths, the knife will be operated when the strip reaches the proper one of the other succeeding pointers. In this phase of the invention, particularly preparing meat for sandwiches, the provision of the sanitary paper to underlie each section of the strip is of importance, since such underlayer of paper cut off simultaneously with the section of the strip permits the meat to be handled without the hands of the preparer actually touching the same.

While the shaping passageway has been illustrated as being of greater width than that of the funnel, it will be apparent that this passageway may have the same width or if desired may even have a narrower width. The width can be varied by removing the two sections of this shaping passageway and substituting therefor two other matched sections of the desired width. In the event it is desired to change the thickness of the resultant strip, such change may be accomplished by removing the top member of the passageway and substituting therefor another member which has shorter side walls 36, which in turn cause the top of this member to be closer to the bottom of the lower member. Various combinations of matched parts of the passageway may be utilized without departing from the spirit of the invention. Moreover, as pointed out hereinbefore, while the funnel has been shown as being made in two sections, it may be very readily made of a single unitary structure.

From the foregoing, it will be seen that the present invention provides a new article of manufacture in the nature of an improved meat product, together with methods of forming the same and mechanism for practicing the method. The invention is capable of modification, in view of which it is not to be limited by the illustrated embodiment but is to be limited only by the scope of the following claims.

I claim:

1. As a new article of manufacture, a strip of fat of substantially uniform width and substantially uniform thickness, said strip having the fiber structure thereof disrupted and rearranged with the fibers crossed to aid cohesion.

2. As a new article of manufacture an extruded strip of fat of substantially uniform thickness and substantially uniform width, said strip having the fiber structure thereof disrupted and rearranged with the fibers crossed to aid cohesion.

3. The method of producing a coherent strip of fat which comprises working separate pieces of fat into a mass, stretching and compressing said mass into a strip of substantially uniform width and substantially uniform thickness, and simultaneously disrupting the fiber structure of said mass and crossing the fibers thereof to increase the cohesion of the strip.

4. The method of producing a coherent strip of fat which comprises working separate pieces of fat into a mass, extruding said mass into a flat strip of substantially uniform width and substantially uniform thickness, and simultaneously disrupting the fiber structure of said mass and crossing the fibers of the material.

FELIX H. LOUISOT.
CHARLES J. MULLER.